United States Patent
Brownjohn et al.

(10) Patent No.: US 8,104,715 B2
(45) Date of Patent: Jan. 31, 2012

(54) WINDOW ARRANGEMENT FOR INSTALLING LARGER AIRCRAFT WINDOWS

(75) Inventors: Nicholas Brownjohn, Buxtehude (DE); Georg Mühlthaler, Hamburg (DE); Rainer Müller, Rosengarten (DE)

(73) Assignee: Airbus Operations GmbH, Hamburg (DE)

( * ) Notice: Subject to any disclaimer, the term of this patent is extended or adjusted under 35 U.S.C. 154(b) by 906 days.

(21) Appl. No.: 12/066,919

(22) PCT Filed: Sep. 5, 2006

(86) PCT No.: PCT/EP2006/008644
§ 371 (c)(1),
(2), (4) Date: Mar. 14, 2008

(87) PCT Pub. No.: WO2007/031214
PCT Pub. Date: Mar. 22, 2007

(65) Prior Publication Data
US 2008/0185479 A1  Aug. 7, 2008

Related U.S. Application Data

(60) Provisional application No. 60/750,913, filed on Dec. 15, 2005.

(30) Foreign Application Priority Data

Sep. 14, 2005 (DE) .......................... 10 2005 043 898

(51) Int. Cl.
*B64C 1/14* (2006.01)
*E06B 7/02* (2006.01)

(52) U.S. Cl. .................. 244/129.3; 244/119; 296/208; 296/190.09; 52/209

(58) Field of Classification Search ............... 244/129.3, 244/119; 296/208, 84.1, 146.15; 454/112; 52/209
See application file for complete search history.

(56) References Cited

U.S. PATENT DOCUMENTS

| | | | | |
|---|---|---|---|---|
| 2,659,942 A | * | 11/1953 | Iverson | ......................... 454/127 |
| 3,508,987 A | | 4/1970 | Burkley et al. | ................. 156/99 |
| 3,596,852 A | | 8/1971 | Wakefield | |
| 4,755,360 A | | 7/1988 | Dickey et al. | |
| 5,005,020 A | * | 4/1991 | Ogawa et al. | ................. 343/713 |

(Continued)

FOREIGN PATENT DOCUMENTS

CN   86200426 U   11/1986

(Continued)

OTHER PUBLICATIONS

International Search Report and Written Opinion in English dated Dec. 19, 2006 issued in corresponding PCT Application No. PCT/EP2006/008644.

*Primary Examiner* — Joshua Michener
*Assistant Examiner* — Joseph W Sanderson
(74) *Attorney, Agent, or Firm* — Ingrassia Fisher & Lorenz, P.C.

(57) ABSTRACT

A window arrangement is provided for enlarging a window area in an aircraft. The window arrangement includes, but is not limited to at least one first installation element. The at least one first installation element is designed to convey fluids, and furthermore includes, but is not limited to a transparent region which covers a first window region such that light waves in the visible spectrum can be let through.

20 Claims, 8 Drawing Sheets

U.S. PATENT DOCUMENTS

| | | | |
|---|---|---|---|
| 5,514,035 A | 5/1996 | Denniston | |
| 5,884,865 A | 3/1999 | Scherer et al. | 244/129.3 |
| 5,941,596 A | 8/1999 | See | |
| 5,988,566 A | 11/1999 | Meyer | |
| 6,168,112 B1 | 1/2001 | Mueller et al. | |
| 6,171,184 B1* | 1/2001 | Robbins | 454/122 |
| 6,450,451 B1* | 9/2002 | Godfrey et al. | 244/129.3 |
| 6,601,799 B2 | 8/2003 | Lau et al. | 244/129.3 |
| 7,118,069 B2* | 10/2006 | Novak et al. | 244/119 |
| 2002/0135881 A1 | 9/2002 | Rukavina et al. | |
| 2004/0028911 A1 | 2/2004 | Hurst et al. | |
| 2004/0062934 A1 | 4/2004 | Miller et al. | |
| 2004/0185195 A1* | 9/2004 | Anderson et al. | 428/34 |
| 2005/0044712 A1* | 3/2005 | Gideon et al. | 29/897.32 |

FOREIGN PATENT DOCUMENTS

| | | |
|---|---|---|
| EP | 0 846 615 | 6/1998 |
| EP | 0 846 615 A2 | 6/1998 |
| EP | 0 713 559 B1 | 5/1999 |
| EP | 1 249 391 | 10/2002 |
| EP | 1 249 391 A2 | 10/2002 |
| EP | 0 936 138 B1 | 5/2003 |
| EP | 0 936 139 B1 | 12/2003 |
| EP | 0 846 616 B1 | 2/2004 |
| EP | 1 510 454 | 3/2005 |
| EP | 1 510 454 A1 | 3/2005 |
| FR | 1025950 | 10/1950 |
| FR | 1 025 950 | 4/1953 |
| GB | 669 602 | 4/1952 |
| GB | 669602 | 4/1952 |
| GB | 2 280 924 A | 2/1995 |
| JP | 09072761 A | 3/1997 |
| JP | 2005509549 A | 4/2005 |
| NL | 47 412 | 11/1939 |
| NL | 47412 C | 12/1939 |
| RU | 2163215 | 2/2001 |
| WO | WO 95/04866 | 2/1995 |
| WO | 03011688 A2 | 2/2003 |

* cited by examiner

WINDOW ARRANGEMENT FOR INSTALLING LARGER AIRCRAFT WINDOWS

CROSS REFERENCE TO RELATED APPLICATIONS

The present application is a 35 U.S.C. §§371 national phase conversion of International application PCT/EP2006/008644, filed Sep. 5, 2006, which claims priority of Germany Patent Application No. DE 10 2005 043 898.9, filed Sep. 14, 2005, and U.S. Provisional patent application 60/750,913, filed Dec. 15, 2005, the disclosures of which have been incorporated herein by reference. The PCT International Application was published in the English language.

TECHNICAL FIELD

The present invention relates to a window arrangement and to a method for enlarging a window area, as well as to the use of the window arrangement in an aircraft.

BACKGROUND TO THE INVENTION

In present-day passenger aircraft, due to structural restrictions, it is often only possible to have very small windows. One of the limiting factors that result in restrictions in the width of aircraft windows relates, for example, to air conveyance lines that usually lead from the cabin floor along the fuselage to the fuselage roof, in order to, in this way, supply passengers with fresh air. In this arrangement the air supply pipes are led along between two transverse supports. In this intermediate region between two transverse supports, in addition the window apertures have to be placed so that the supply lines and the windows have to share the same area. However, since as a result of structural restrictions the distance between transverse supports cannot be increased at will, the aircraft windows are of an extremely small design.

One solution to this problem can consist of reducing the size of the air conveyance lines. However, such a reduction in size is associated with negative characteristics because the conveyed air generates air flow noise and at the same time loses pressure as a result of insufficiently large lines. Any noise reduction by using very wide air conveyance devices is also difficult because, conversely, the size of the windows has to be reduced. Furthermore, the height of the aircraft windows is limited by the longeron spars of the fuselage structure.

Normally, aircraft window arrangements are designed as a double window system. EP 0 936 138, U.S. Pat. No. 5,884,865 and EP 0 846 616 disclose methods for installation of an aircraft window. In this arrangement an exterior primary window is affixed to the exterior skin of a fuselage, and a secondary interior aircraft window is affixed to the interior of the fuselage. The intermediate space is often used to provide sound absorption and insulation in relation to ambient pressure and ambient temperatures. Due to the cold exterior ambient temperatures the exterior primary window is often very cold so that the air in the interior, between the primary and the secondary window panes, condenses on the exterior primary window pane. In order to prevent this the interior space can be vented or condensation can be prevented by way of condensation channels.

EP 1 510 454 discloses a fuselage region that discloses insulation and air lines in a particular arrangement. To provide adequate space for the windows the air lines are routed around the window apertures in an extremely complex manner. However, as mentioned in the introduction, as a result of the reduction in size of the line cross-section of the air line an unpleasant airflow noise can arise. In particular, the solution offered in EP 1 510 454 does not provide a possibility of effectively increasing the size of the windows.

U.S. Pat. No. 6,601,799 discloses a system for increasing the interior secondary window area in an aircraft. In this arrangement a larger cutout is created on the interior. This provides a larger secondary window, without, however, effectively enlarging the outer primary window area.

EP 0 713 559 B1 discloses the body of a terrestrial vehicle or an aircraft, which for the purpose of supporting the cover or ceiling pillar provides supports from structural, stable, load-bearing, transparent or translucent material.

PRESENTATION OF THE INVENTION

Among other things, it may be an object of the present invention to provide a window arrangement for enhancing passenger comfort.

According to an exemplary embodiment of the invention a window arrangement (in particular for enlarging a window area) of an aircraft is provided, comprising at least one first installation element. The at least one installation element is designed to convey fluids and at the same time comprises a transparent region. In this arrangement, the transparent region of the at least one first installation element covers a first window region such that light waves in the visible spectrum can be let through.

According to a further exemplary embodiment of the invention a method for enlarging a window area of an aircraft is provided, wherein in a first step at least one first installation element is installed, wherein the at least one first installation element comprises a first transparent region, and the transparent region covers at least one first window region such that light waves in the visible spectrum can be let through.

According to still another exemplary embodiment of the invention an aircraft is created that comprises a window arrangement for enlarging a window area according to an exemplary embodiment of the invention.

According to another exemplary embodiment of the invention a window arrangement according to an exemplary embodiment of the invention is used in an aircraft.

The present invention may provide the option of significantly enhancing passenger comfort in that the window area may be enlarged, thus possibly providing passengers with a clearly improved view. Up to now the size of aircraft windows was limited by the space required between two transverse supports. By designing a visually transparent installation element according to an exemplary embodiment of the invention, there may be the option of creating the complete region between two transverse supports as a window area in that the first window region and the transparent region of the first installation element are at least in part one on top of the other, instead of one being arranged beside the other as has exclusively been the case up to now. Apart from enlarging the window area and thus enhancing a passenger's view and comfort it may also be possible to design fluid conveyance more advantageously by the first installation element because airflow noises due to the narrow design of air ducts may be avoided by the now possible increase in the cross section of the first installation element.

Within the context of this application the term "fluid" refers in particular to any fluid or any gas as well as corresponding fluid-gas mixtures, in particular made of optically transparent material. Thus, the invention comprises in particular at least partly transparent gas supply lines (e.g. for conveying cabin air), fluid supply lines (for example for providing fresh water in aircraft toilets), etc.

Within the context of this application the term "installation element" refers in particular to any component that is suitable for installation in a higher-order system, for example for installation in an aircraft.

Exemplary fields of application of the invention include any type of means of transport, in particular aircraft, dirigibles or airships, buses, trains, passenger motor vehicles, lorries, ships, etc.

Transparent materials as such are known to the average person skilled in the art; they are, for example, disclosed in the Japanese printed publication JP 09072761 as well as in US 2004/0062934 which are hereby incorporated herein by reference. In JP 09072761 a glass panel can be coated with titanium oxide so that a linear translucency of 50% is possible. In contrast to this, US 2004/0062934 discloses a visually transparent and structural laminate structure. Light waves in the visible spectrum may be let through across a wide light-wave range. Furthermore, the material may easily be formed so that complex shapes may be created. Such materials may also be used within the context of the present invention.

According to a further exemplary embodiment of the present invention the window arrangement or window system comprises at least a second installation element, wherein the second installation element comprises a transparent region which covers at least one first window region such that light waves in the visible spectrum can be let through.

According to a further exemplary embodiment the second installation element can be selected from an element from the group consisting of ribs, braces and supporting structures. Modern materials may make it possible to create transparent structures which are nonetheless very capable in terms of their load-bearing ability. This may make it possible to create transparent transverse supports and longitudinal supports. Adjacent aircraft windows that up to now have been situated apart from each other may be joined to form one large aircraft window. Furthermore, it may be possible to combine not only two but a plurality of aircraft windows so that a nearly complete transparent fuselage or a large panorama window may be designed. Since the intermediate region between the longitudinal supports and transverse supports may be completely utilized due to transparent installation elements, there may also be the option of creating an optimised structure by using narrower transparent longitudinal supports and transverse supports that are instead arranged at smaller distances from each other. This may make it possible to save weight and costs.

According to a further exemplary embodiment of the present invention the at least one second installation element can be designed for lining or encasing the cabin interior. In this way, by way of transparent materials or installation elements, completely new design options for the cabin layout might arise. For example, modern and lighter design options and an improved feeling of space for passengers may be created.

According to a further exemplary embodiment the at least one first installation element, comprises at least one fluid inlet and at least one fluid outlet. Due to there no longer being any spatial restrictions because of the transparent first installation element there may be an option of optimally arranging at least one or a plurality of fluid inlets and/or fluid outlets so that circulation in the fluid system may be significantly improved. In this way, for example, the energy for operating a fluid system, or the flow noises, may be significantly reduced.

According to a further exemplary embodiment of the present invention the window arrangement further comprises a first window region that is affixed or attached to and/or in an aircraft skin such that the interior of the aircraft is insulated, thermally and stably when subjected to pressure, from an exterior atmosphere.

In a further exemplary embodiment of the present invention the first window region is integrally and in one piece (for example made in one piece and/or made from one material) designed with the transparent region of the at least one first installation element and/or with the transparent region of the at least one second installation element. In this way complex constructions, such as for example double-window constructions, may be avoidable. A single window pane may be sufficient to provide thermal insulation and stability when subjected to pressure in relation to the exterior atmosphere, as a result of which significant costs and weight may be saved.

According to a further exemplary embodiment the at least one first installation element, and/or the at least one second installation element comprise/comprises transparent current conductors and/or optical wave guides for transmitting signals. With the use of modern materials signal transmission may be arranged by way of transparent lines. In this way necessary signal connections or current connections may also be routed by way of window regions of the aircraft, and further space for aircraft windows may be created.

According to an exemplary embodiment of the invention the at least one first installation element in the transparent region comprises at least one vent hole or vent drill for venting the first window region. This may create a system for preventing condensation, without the need for additional installation parts. By simple boreholes in the first fluid-conveying installation element, by way of the connected venting of the first window region, the window pane may be heated or dried, as a result of which an extremely lightweight and economical method for preventing condensation may be provided.

According to a further exemplary embodiment the window arrangement comprises a second window region, wherein between the first window region and the second window region transparent first installation elements and/or transparent second installation elements extend. This may make possible an unlimited design of transparent areas in a fuselage without thereby weakening the structure. In this way long panorama windows may be created so that the view which passengers enjoy and passenger comfort in general may be enhanced.

The embodiments of the device also apply to the method and to the aircraft, as well as to the use, and vice-versa.

The window arrangement or window assembly according to an exemplary embodiment of the invention, including the above-mentioned exemplary embodiments, may provide options of enhancing the aircraft's comfort by opening up the view for passengers, while at the same time creating less complex devices. With the use of transparent materials there may be no restrictions concerning the covering of installation elements, several situated one on top of the other. With superposition of several different layers of transparent installation elements, each of which may carry out different types of functions, any desired window arrangements may be possible. Furthermore, there may no longer be any restrictions relating to structural weakening or covering up by installation elements. This may also result in an advantage of creating simpler constructions for window arrangements because nevertheless a stable structure can be created, as a result of which, overall, lighter-weight cost-saving solutions may be created.

BRIEF DESCRIPTION OF THE DRAWINGS

Below, for further explanation and to provide a better understanding of the present invention, exemplary embodiments are described in more detail with reference to the enclosed drawings. The following are shown:

FIGS. 5 *a-d* a diagrammatic view of various exemplary embodiments of the first installation element;

DETAILED DESCRIPTION OF EXEMPLARY EMBODIMENTS

Identical or similar components in different figures have the same reference signs.

The illustrations in the figures are diagrammatic and not to scale.

Figure 4:
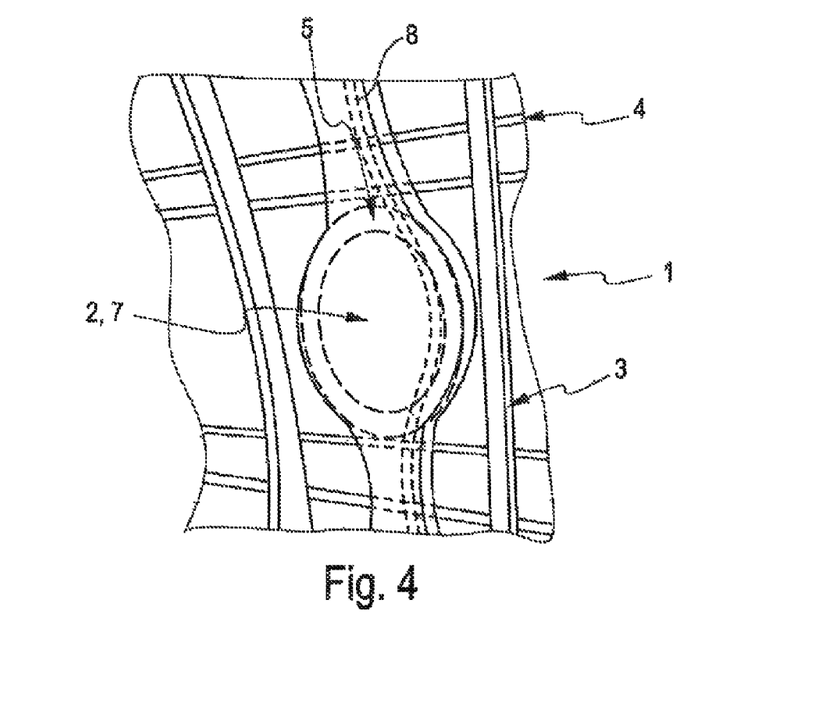
FIG. 4 a window arrangement according to an exemplary embodiment of the present invention.

FIG. 4 shows a window arrangement for enhancing a window area of an aircraft, according to an exemplary embodiment of the present invention. Above a window element 2, 7 installed in the fuselage 1 there is a first installation element 5 according to an exemplary embodiment of the invention, which installation element 5 comprises a transparent region that covers at least part of the window aperture 2, 7. In the first installation element 5 fluid can be conveyed, and space can be saved by arranging said first installation element above the window. A transparent current conductor and/or optical wave guide 8 is arranged in the window element.

Figure 1:
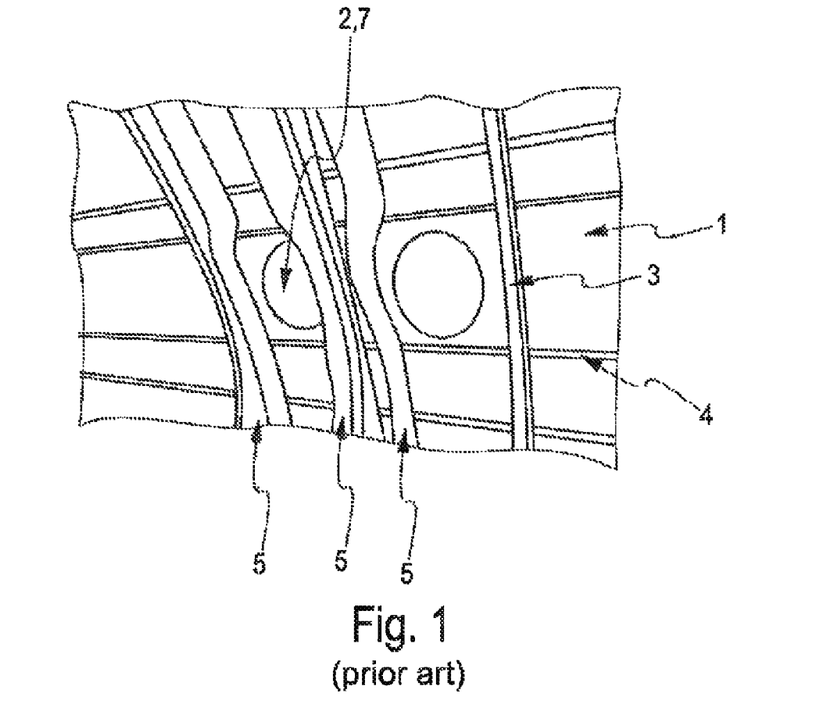
FIG. 1 a design of a window arrangement.

FIG. 1 shows a conventional window arrangement in a passenger aircraft. The air conveyance lines 5 are routed around the window apertures 2, 7 in the fuselage 1. In order to reinforce the fuselage 1, at specified spacing, ribs 3 and stringers 4 are in place, which for reasons of structural stability should not exceed a certain distance from each other. This results in an extremely small useful area in which a window surface 2, 7 can be installed.

Figure 2:
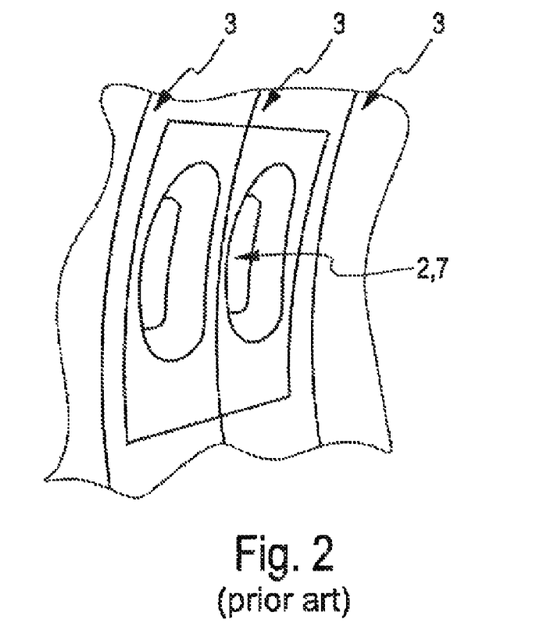
FIG. 2 a window arrangement with windows that are stretchable in height.

FIG. 2 shows an existing option of increasing the window area at least as far as its height is concerned. The fuselage 1 shows window regions 2, 7 which, due to the installation of the ribs 3 and the stringers 4, can only be increased in height.

Figure 3:
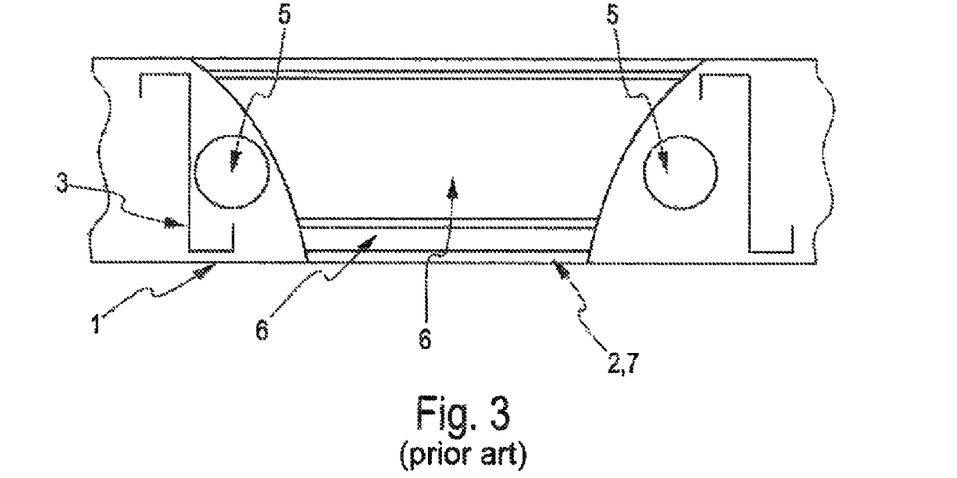
FIG. 3 a diagrammatic view of the interior design.

FIG. 3 shows a cross section of a conventional window arrangement. On the fuselage 1, a first window area 2, 7 is installed on the outside. On the inside of the aircraft cabin there is a second window area. Between the respective window areas there are vented regions 6 to provide insulation and prevent condensation on the cold exterior first window area 2, 7. At the respective margins the restricting stringers 3 are shown, wherein the air conveyance lines 5 are arranged between the stringers 3 and the window aperture 2, 7. This shows that it is practically impossible to increase the width of the window area. Any reduction in the size of the air conveyance lines 5 would disadvantageously increase airflow noises to such an extent that passengers would find them intrusive.

FIG. 4 shows a window arrangement, according to an exemplary embodiment of the invention, for enlarging a window area of an aircraft. As already described, a fuselage 1 is shown which is reinforced by ribs 3 and stringers 45. Between the stringers and the ribs 3, 5 there is the window area 2, 7 which is covered by the transparent region of the first installation element 5. In this way passengers can comfortably see through the transparent region of the first installation element 5 and through the first window area 2, 7. Because of the likewise freely designable size of the first installation element 5, more fluid can be conveyed with significantly less noise so that intrusive flow noises and at the same time flow losses can be prevented.

Figures 5A, 5B:
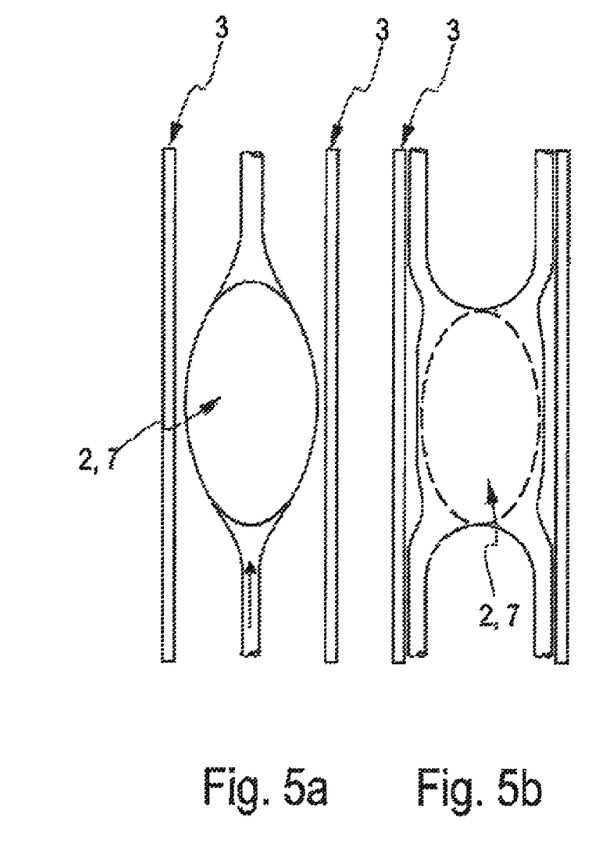
Figure 5C:
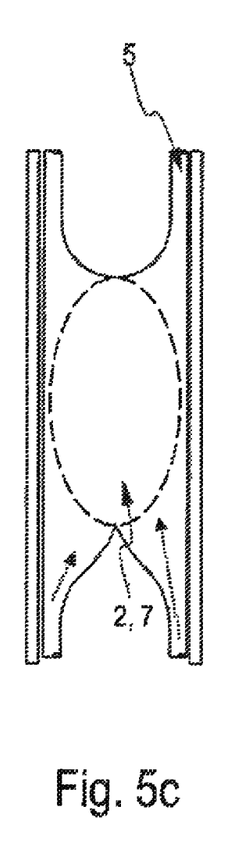
Figure 5D:
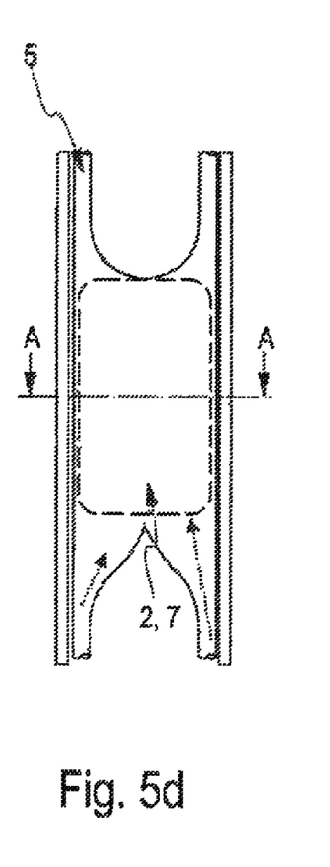

FIG. 5 shows various embodiments of the first installation element 5. For example, in the first embodiment a first installation element 5 can comprise an air inlet and an air outlet. For better distribution or better circulation there is also the option of providing two or a plurality of air inlets and air outlets so as to significantly optimize the characteristics of the flow. The shape of the first installation element 5 can also be designed so as to be variable.

Figure 6:
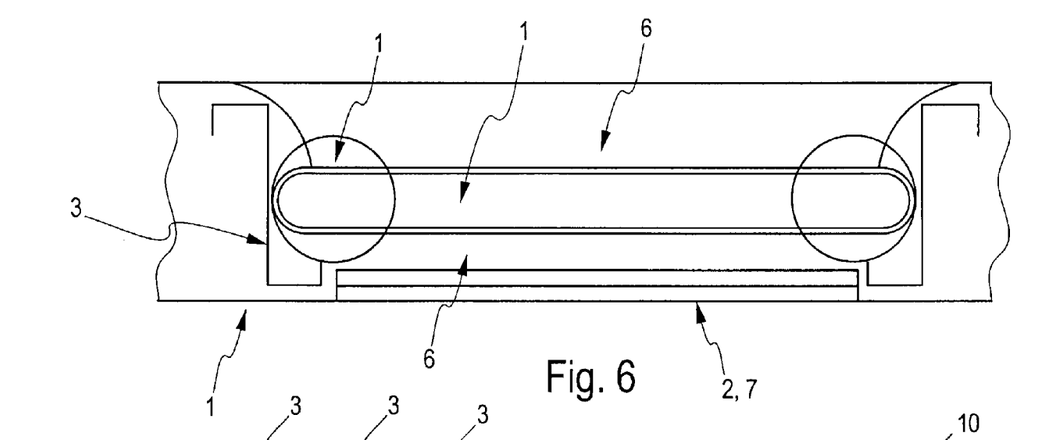
FIG. 6 a diagrammatic view of the interior design according to the present invention.

FIG. 6 shows a view of section A-A from FIG. 5, which section shows a diagrammatic view of the window arrangement according to an exemplary embodiment of the invention. The diagram shows that while the ribs 3 restrict the space of the window size, the window area nevertheless extends across the region of the air conveyance line 5, because both elements, the first installation element 5 and the window area 2, 7, are placed one above the other so that they can utilize the entire space between the two transverse supports 3.

Figure 7:
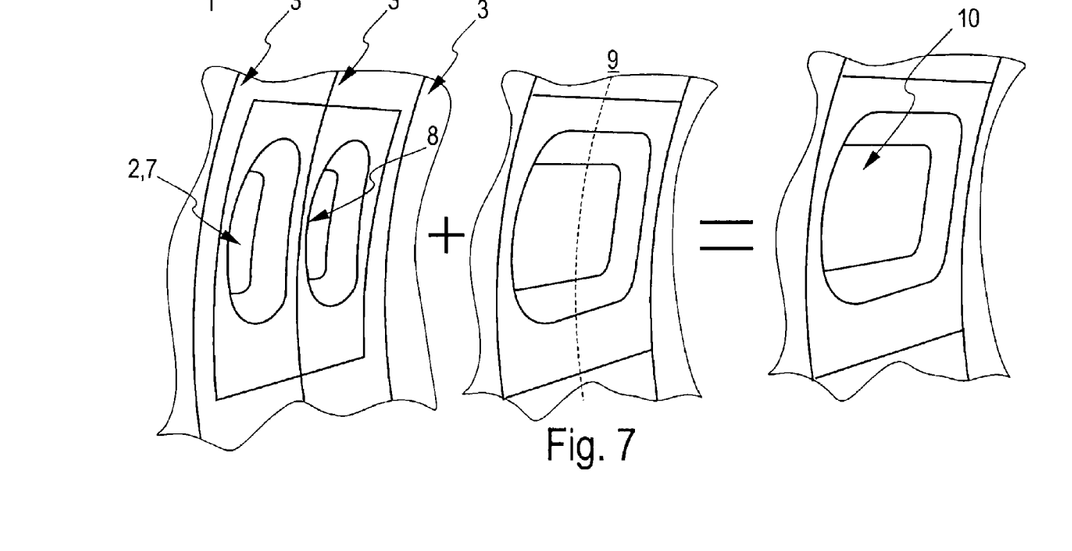
FIG. 7 a diagrammatic view of a window arrangement with the use of second installation elements.

FIG. 7 shows a further option for enlarging the window area in an aircraft. By using transparent transverse supports 3, two adjacent window areas 2, 7, 8 can be brought together so that a large panorama window 10 is created. This becomes possible in that the second attachment element 9, which for example comprises transparent transverse supports 9 or structural elements 9, is of transparent design so that it can cover the window area without impeding the view.

Figure 8:
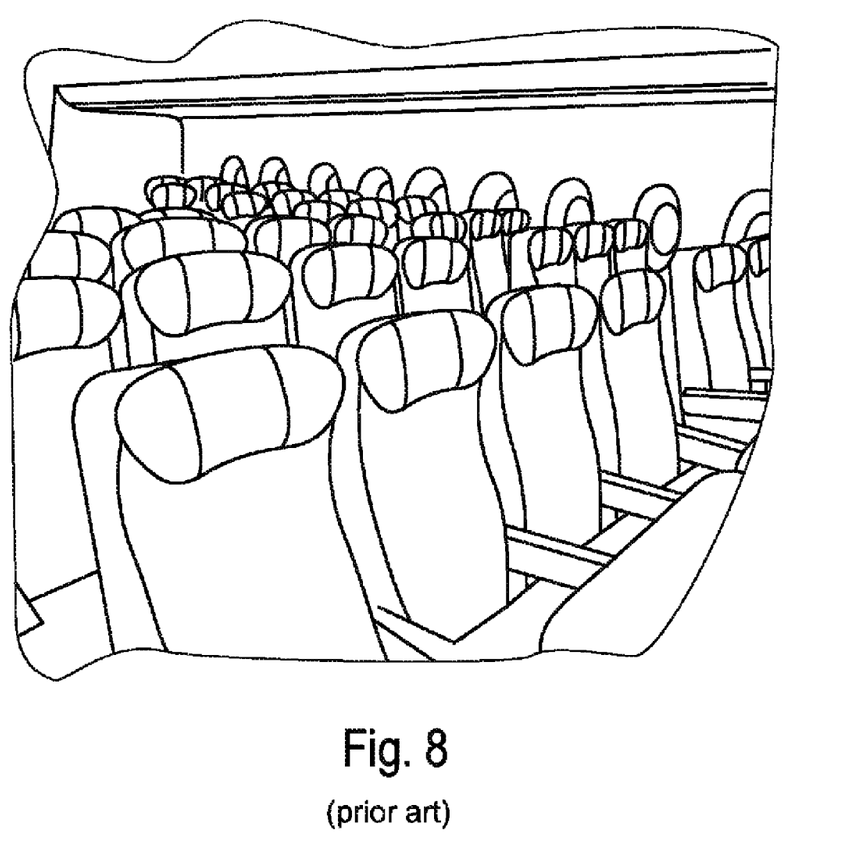
FIG. 8 a three-dimensional view of a cabin layout.
Figure 9:
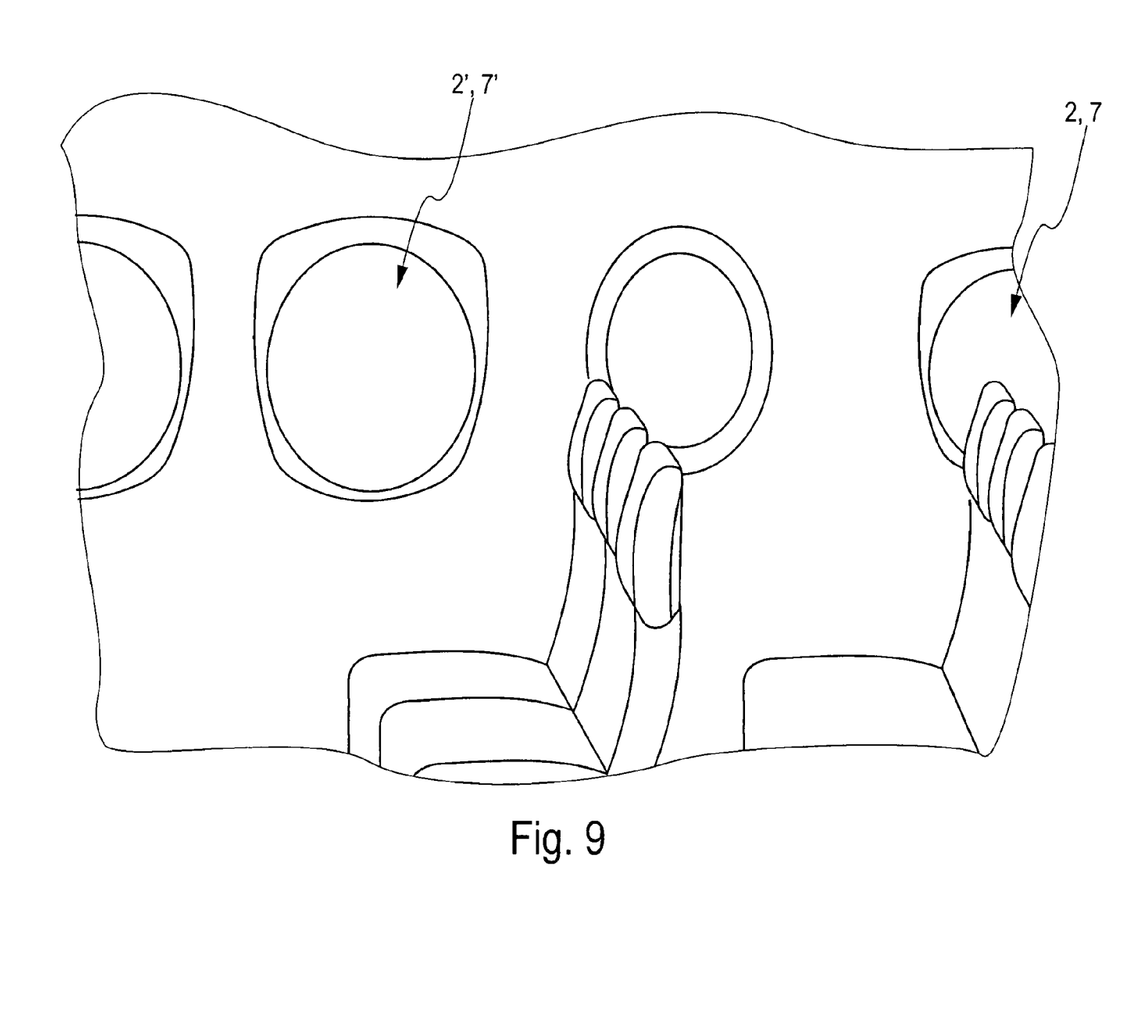
FIG. 9 a three-dimensional view of a cabin layout with a window arrangement according to the invention and with a conventional window arrangement.
Figure 10:
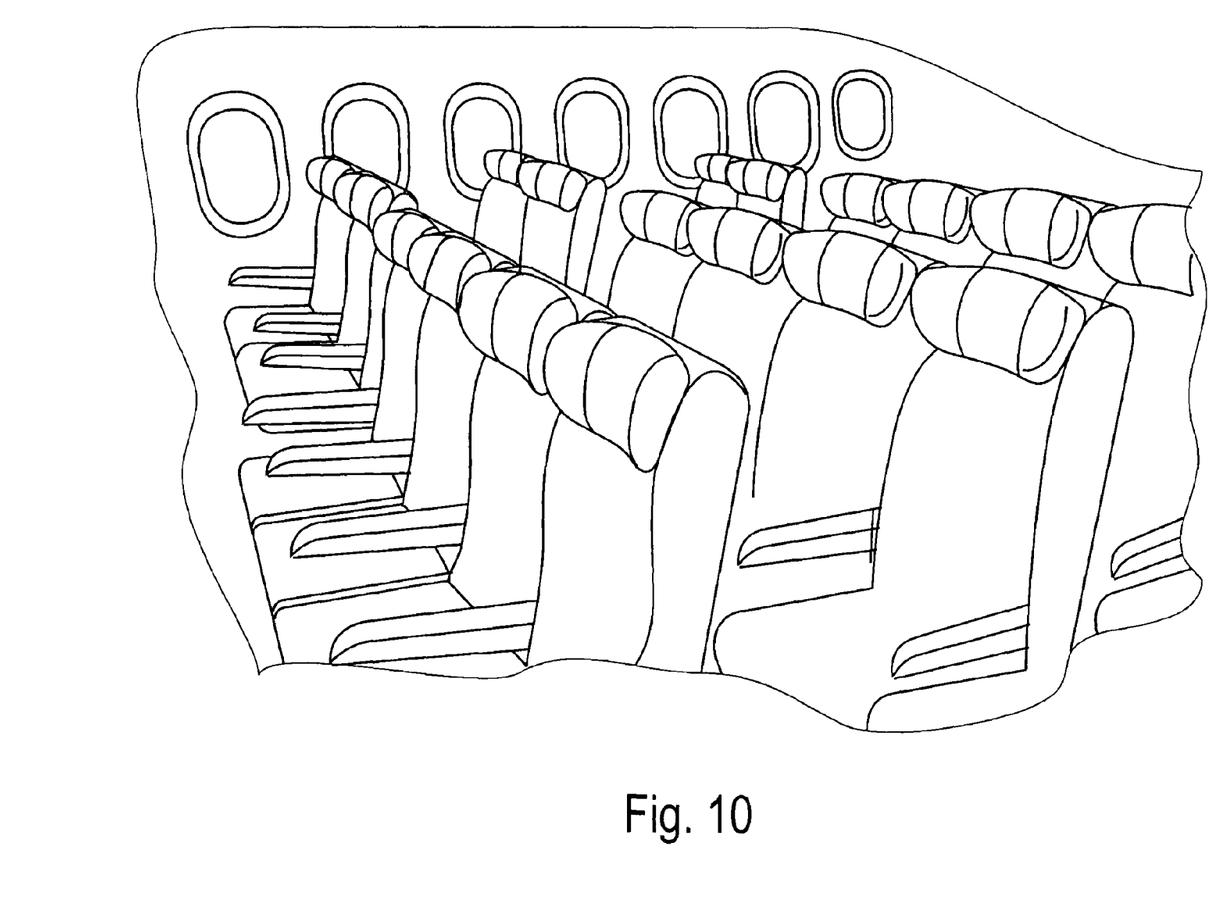
FIGS. 10 to 13 a three-dimensional view of a cabin layout with the window arrangement according to the invention.
Figure 11:
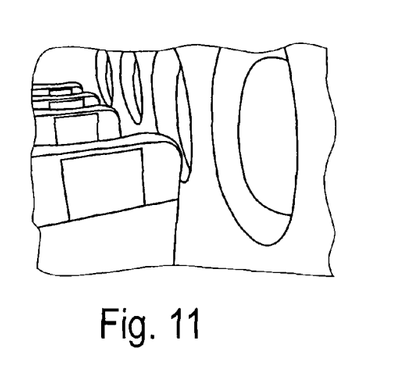
Figure 12:
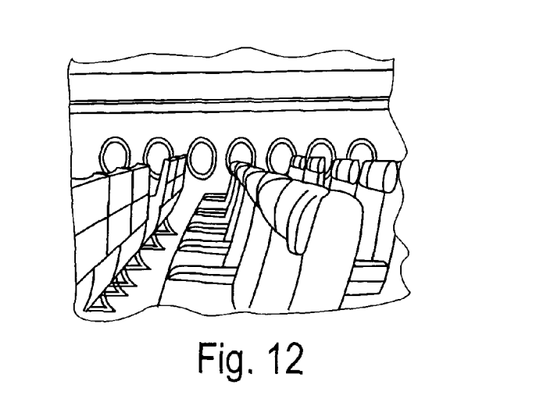
Figure 13:
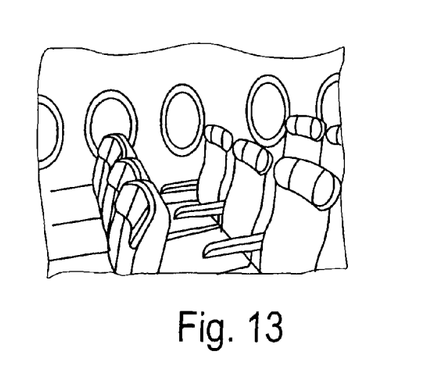

FIG. 8 shows a customary cabin layout of a passenger aircraft with small aircraft windows.

FIGS. 9-13 show embodiments with the window arrangement according to an exemplary embodiment of the invention, for enlarging the window areas in an aircraft. As a result of the significantly larger exterior windows 2, 7 passengers experience an optimal feeling of spaciousness, which significantly enhances passenger comfort. The difference is particularly evident in FIG. 9. When compared to the conventional aircraft window arrangements 2, 7, a significant enlargement can be achieved with the arrangement, according to an exemplary embodiment of the invention, of the windows 2', 7'.

In addition it should be pointed out that "comprising" does not exclude other elements or steps, and "a" or "one" does not exclude a plural number. Furthermore, it should be pointed out that features or steps which have been described with reference to one of the above exemplary embodiments can also be used in combination with other features or steps of other exemplary embodiments described above. Reference signs in the claims are not to be interpreted as limitations.

The invention claimed is:

1. A window arrangement for an aircraft, wherein the window arrangement comprises:
    a window area;

at least one first installation element serving as fluid conveyance line;

wherein the at least one first installation element includes a duct configured to convey fluids from an aircraft cabin floor via a fluid inlet to an aircraft fuselage roof via a fluid outlet;

wherein the at least one first installation element comprises a transparent region;

wherein the transparent region covers at least part of at least a first window region such that light waves in the visible spectrum can be let through; and wherein the duct and the transparent region are placed one above the other such that the transparent region extends across a region of the fluid conveyance line.

2. The window arrangement of claim 1, further comprising at least one second installation element, wherein the at least one second installation element comprises a transparent region; and wherein the transparent region of the at least one second installation element covers the at least one first window region in such a way that light waves in the visible spectrum can be let through.

3. The window arrangement of claim 2, wherein the at least one second installation element is at least one installation element selected from a group consisting of ribs, braces and supporting structures.

4. The window arrangement of claim 2, wherein the at least one second installation element is designed for lining a cabin interior.

5. The window arrangement of claim 2, wherein the at least one first installation element comprises transparent current conductors.

6. The window arrangement of claim 2, wherein the at least one first installation element in its transparent region comprises vent holes for venting the first window region.

7. The window arrangement of claim 2, further comprising:
a second window region,
wherein the transparent region of the first installation element extends between the first window region and the second window region.

8. The window arrangement claim 2, wherein the at least one second installation element comprises transparent current conductors.

9. The window arrangement of claim 2, wherein the at least one first installation element comprises optical wave guides for transmitting signals.

10. The window arrangement of claim 2, wherein the at least one second installation element comprises optical wave guides for transmitting signals.

11. The window arrangement of claim 2, further comprising:
a second window region,
wherein the transparent region of the second installation extends between the first window region and the second window region.

12. The window arrangement of claim 1, further comprising the at least one first window region that is affixed to an aircraft skin in such a way that the interior of the aircraft is insulated, thermally and stably when subjected to pressure, from an exterior atmosphere.

13. The window arrangement of claim 1, wherein the at least one first window region is integrally and in one piece designed with the transparent region of the at least one first installation element.

14. The window arrangement of claim 1, further comprising the at least one first window region that is in an aircraft skin in such a way that the interior of the aircraft is insulated, thermally and stably when subjected to pressure, from an exterior atmosphere.

15. The window arrangement of claim 1, wherein the at least one first window region is integrally and in one piece designed with the transparent region of the at least one second transparent installation element.

16. A method for enlarging a window area of an aircraft, wherein the method comprises:
installation of at least one first installation element serving as fluid conveyance line and including a duct configured for conveying fluids from an aircraft cabin floor via a fluid inlet to an aircraft fuselage roof via a fluid outlet, the at least one first installation element comprises a transparent region;

placing the duct and the transparent region one above the other such that the transparent region extends across a region of the fluid conveyance line; and covering at least part of at least one first window region with the transparent region such that light waves in the visible spectrum can be let through.

17. An aircraft comprising:
a cabin floor;
a fuselage roof; and
a window arrangement, the window arrangement comprising:
a window area
at least one first installation element serving as fluid conveyance line;
wherein the at least one first installation element includes a duct configured to convey fluids from an aircraft cabin floor via a fluid inlet to an aircraft fuselage roof via a fluid outlet;
wherein the at least one first installation element comprises a transparent region;
wherein the transparent region covers at least part of at least a first window region such that light waves in the visible spectrum can be let through; and
wherein the duct and the transparent region are placed one above the other such that the transparent region extends across a region of the fluid conveyance line.

18. The aircraft of claim 17, further comprising:
at least one second installation element,
wherein the at least one second installation element comprises a transparent region; and
wherein the transparent region of the at least one second installation element covers the at least one first window region in such a way that light waves in the visible spectrum can be let through.

19. The aircraft of claim 18, wherein the at least one second installation element is at least one installation element selected from a group consisting of ribs, braces and supporting structures.

20. The aircraft of claim 18, wherein the at least one second installation element is designed for lining a cabin interior.

* * * * *

UNITED STATES PATENT AND TRADEMARK OFFICE
CERTIFICATE OF CORRECTION

| | | |
|---|---|---|
| PATENT NO. | : 8,104,715 B2 | Page 1 of 1 |
| APPLICATION NO. | : 12/066919 | |
| DATED | : January 31, 2012 | |
| INVENTOR(S) | : Nicholas Brownjohn et al. | |

It is certified that error appears in the above-identified patent and that said Letters Patent is hereby corrected as shown below:

Column 7, line 41, "The window arrangement claim 2," should be changed to --The window arrangement of claim 2,--;

Column 8, line 33, "a window area" should be changed to --a window area;--

Signed and Sealed this
Fifteenth Day of May, 2012

David J. Kappos
*Director of the United States Patent and Trademark Office*